US012436586B2

(12) United States Patent
Rajwan et al.

(10) Patent No.: US 12,436,586 B2
(45) Date of Patent: Oct. 7, 2025

(54) QUALITY-OF-SERVICE-BASED FABRIC POWER MANAGEMENT

(71) Applicant: Apple Inc., Cupertino, CA (US)

(72) Inventors: Doron Rajwan, Rishon LeZion (IL); Alexander Gendler, Kiriat Ata (IL); Daniel U. Becker, San Jose, CA (US); Saher Odeh, Nazareth (IL); Ilya Granovsky, Kiryat Tivon (IL); Lior Zimet, Kerem Maharal (IL)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 18/365,783

(22) Filed: Aug. 4, 2023

(65) Prior Publication Data
US 2025/0044844 A1   Feb. 6, 2025

(51) Int. Cl.
G06F 1/26   (2006.01)
(52) U.S. Cl.
CPC ..................... G06F 1/26 (2013.01)
(58) Field of Classification Search
CPC ....................................... G06F 1/26
See application file for complete search history.

(56) References Cited

U.S. PATENT DOCUMENTS

| | | | | |
|---|---|---|---|---|
| 10,700,954 | B2* | 6/2020 | Hunt | G06F 9/5011 |
| 12,093,541 | B1* | 9/2024 | Mathews | G06F 3/0611 |
| 2002/0146022 | A1* | 10/2002 | Van Doren | H04L 49/506 370/429 |
| 2005/0281275 | A1 | 12/2005 | Haghighi | |
| 2013/0054901 | A1 | 2/2013 | Biswas et al. | |
| 2014/0086070 | A1* | 3/2014 | Saund | G06F 13/1605 370/252 |
| 2014/0201471 | A1 | 7/2014 | Cutter et al. | |
| 2014/0240326 | A1 | 8/2014 | Cutter et al. | |
| 2017/0055218 | A1 | 2/2017 | Fukami et al. | |
| 2017/0131755 | A1* | 5/2017 | Sadhu | G06F 13/26 |
| 2020/0403909 | A1 | 12/2020 | Kleyman et al. | |
| 2022/0365896 | A1 | 11/2022 | Tolchinsky et al. | |
| 2023/0123281 | A1* | 4/2023 | Liu | G06F 1/08 713/501 |
| 2025/0021338 | A1* | 1/2025 | Al-Otoom | G06F 9/3808 |

FOREIGN PATENT DOCUMENTS

WO   2021262197 A1   12/2021

* cited by examiner

Primary Examiner — Jaweed A Abbaszadeh
Assistant Examiner — Ayman Fatima
(74) Attorney, Agent, or Firm — Kowert, Hood, Munyon, Rankin & Goetzel, P.C.; Michael B. Davis; Dean M. Munyon

(57) ABSTRACT

Techniques are disclosed relating to selective rate limiting and reducing clock frequency of fabric circuitry in response to certain power management events. Disclosed techniques may advantageously allow power management circuitry to reduce or avoid negative impacts of power events by reducing the clock frequency of a communication fabric while using rate limiting of relatively lower-priority traffic to reduce impacts of the frequency reduction on high-priority traffic. For example, rate limiting of lower-quality-of-service virtual channels may continue after recovery of the clock frequency until higher-quality-of-service virtual channels have recovered from the frequency reduction.

17 Claims, 9 Drawing Sheets

QUALITY-OF-SERVICE-BASED FABRIC POWER MANAGEMENT

BACKGROUND

Technical Field

This disclosure relates generally to computer architecture and more particularly to power management techniques for communication fabrics.

Description of Related Art

System on a chip (SoC) devices typically include multiple components such as central processing units, graphics processors, display units, I/O controllers, etc. Activity by components may be limited based on power or thermal concerns, in certain situations, e.g., to avoid equipment damage, improve battery life, etc.

DETAILED DESCRIPTION

Computing devices often include various components (e.g., central processing units, graphics processing units, display units, machine learning accelerator units, etc.), some of which may be included in a system-on-a-chip (SOC). When multiple components are active, power control circuitry may reduce activity by one or more components, e.g., by reducing clock frequency. This may avoid exceeding the capabilities of a power supply, avoid damaging a battery for mobile devices, etc. In some embodiments, the communications fabric that connects various components may also consume substantial power and may similarly have its activity reduced (e.g., by reducing its clock frequency). This may be problematic for certain types of data, e.g., video data that has real-time deadlines.

Therefore, in disclosed embodiments, selective rate limiter circuitry is configured to limit the rate of lower-QoS fabric traffic in certain power management situations. This rate limiting may occur in parallel with clock frequency management for the fabric, which may downshift a clock frequency and then gradually increase the frequency (e.g., to the original frequency before a power management event). The rate limiting may continue after recovery of the clock frequency, e.g., until higher-QoS traffic has recovered from the clock downshift. Disclosed techniques may advantageously reduce or avoid problems associated with high-current operating scenarios, while mitigating effects of power control actions on higher-QoS fabric traffic.

As one specific example, disclosed techniques may restrict activity by one or more processors such as GPU(s) or CPU(s) while provided sufficient bandwidth for display data, audio data, or both, e.g., where bandwidth shortfalls might directly impact user experience.

Example Device with Selective Rate Limiter Circuitry

Figure 1:
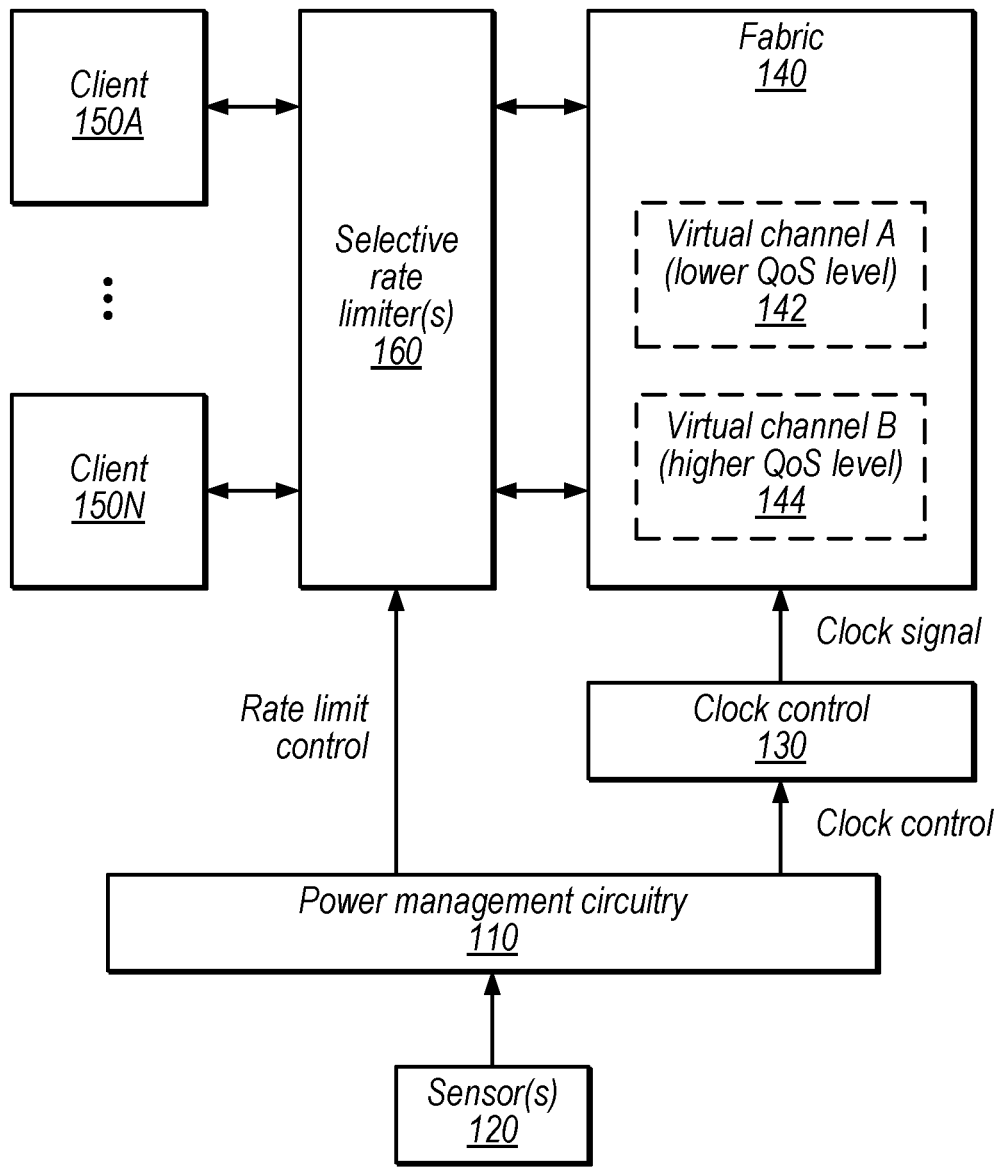
FIG. 1 is a block diagram illustrating example control circuitry configured to selectively rate limit a lower-quality-of-service virtual channel, according to some embodiments.

FIG. 1 is a block diagram illustrating a computing device with selective rate limit control for fabric traffic, according to some embodiments. In the illustrated example, the device includes power management circuitry 110, sensor(s) 120, clock control circuitry 130, fabric circuitry 140, clients 150A-150N, and selective rate limiter(s) 160.

Clients 150, in some embodiments, are configured to communicate with each other, with other components, etc. via fabric 140. The device and fabric 140 may support a set of virtual channels and a given client may support a subset of those virtual channels (as discussed below in detail with reference to FIG. 5). Clients 150 may include central processing units, graphics processors, I/O controllers, machine learning accelerators, display units, memory controllers, memory caches, etc.

Fabric 140, in the illustrated embodiment, supports at least two virtual channels with different quality-of-service levels (channel A 142 and channel B 144). Virtual channels (VCs) are channels that physically share a network but which are logically independent on the network. Network switches that are shared by multiple virtual channels may employ resources dedicated to each virtual channel (e.g., buffers) so that communications on the virtual channels remain logically independent. Thus, the different virtual channels may share various fabric network hardware resources such as switches but may have different buffers in fabric 140 for buffering communications. Arbitration circuitry may enforce quality-of-service guarantees or parameters for different virtual channels. Note that while various disclosed embodiments rate limit certain virtual channels, disclosed techniques may also be implemented among different physical channels that have different quality-of-service parameters.

Different traffic classes may have different quality-of-service targets or parameters. Various network components may enforce quality-of-service parameters, such as arbitration circuitry in network switches, rate limit control circuitry for one or more agents (which may include circuitry at the source, destination, or both), etc. As one example class of traffic, a low latency traffic (LLT) class may have a quality-of-service priority for latency and the rate at which a given agent may initiate LLT requests may be limited (e.g., using a leaky-bucket credit system). As another example, an isochronous (ISOC) class may have a quality-of-service priority for latency but may not be rate limited. Isochronous data may be provided at a regular rate over time. That is, the data may be transmitted at substantially fixed intervals in real time, and variation from the interval may cause underrun or overrun of the data. For audio data, for example, underruns may result in audible skipping in the sounds (or drop outs), and overruns may result in lost sound. As another example, real-time traffic may have bandwidth quality of service guarantees. One or more bulk virtual channels may be used for various types of lower-priority traffic.

For additional background material regarding example virtual channels, note that U.S. patent application Ser. No. 17/456,347 filed Nov. 23, 2021 and titled "Handling Eviction Write Operations Caused by Rate-Limited Traffic" discusses examples of different types of virtual channels and example rate limiting techniques in other contexts. Note that fabric 140 may include internal rate limiters for one or more virtual channels and disclosed rate limiter techniques based on power management events may be additional rate limiting on activity from one or more clients. In particular, disclosed techniques may block or reduce rate-limited traffic before it even reaches the fabric, in certain situations.

Note that fabric 140 may be a single network or multiple networks that are at least partially independent. For example, U.S. patent Ser. No. 17/337,805, titled "Multiple Independent On-chip Interconnect" and filed Jun. 3, 2021 is incorporated by reference herein in its entirety. The '805 application discusses an example SoC with multiple networks with different characteristics. In this example, a given transaction may be assigned to a network and virtual channel before being transmitted. Different networks may have different coherency, quality-of-service guarantees, ordering, data formats, etc.

Power management circuitry 110, in some embodiments, is configured to receive measurement data from sensor(s) 120 and generate various power control signals. In the illustrated example, the power control signals include a rate limit control signal to selective rate limiter(s) 160 and a clock control signal to clock control circuitry 130. Sensor(s) 120 may measure current, voltage, temperature, etc., or some combination thereof. In response to detecting a power management event (e.g., a high-current scenario), power management circuitry 110 may, in parallel, reduce the frequency of the clock to fabric 140 and impose a rate limit on one or more virtual channels supported by fabric 140.

Power management circuitry 110 may be implemented on the same semiconductor substrate as the other illustrated components or on a separate substrate. In multi-die embodiments, power management circuitry 110 may receive sensor measurements from multiple dies.

Selective rate limiter(s) 160, in the illustrated embodiment, include one or more rate limiter circuits configured to enforce rate limits signaled by power management circuitry 110. Note that rate limiters may be included in a client 150, included in fabric 140, be implemented separately from clients 150 and fabric 140, or some combination thereof. As discussed below with reference to FIG. 3, a rate limiter may include arbitration circuitry configured to select communication data from different buffers for different virtual channels to implement a desired ratio, a desired maximum amount of communications for a given virtual channel, etc. Note that different rate limiters may be implemented for different clients that support different subsets of virtual channels.

Note that when rates are already different for different virtual channels during default operation, the disclosed rate limiting may increase or decrease the existing rate difference. Further, the rate limiting may be selective in the sense that only certain channels are rate limited or selective in the sense that different channels experience different levels of limiting.

Clock control circuitry 130, in some embodiments, is configured to downshift the frequency of the clock signal provided to fabric 140 based on clock control signals from power management circuitry 110. U.S. patent application Ser. No. 15/419,218 titled "Detecting Power Supply Noise Events and Initiating Corrective Action" and filed on Jan. 30, 2017 is incorporated by reference herein in its entirety. The '218 application discusses example techniques for rapid clock frequency downshifting based on certain power events. Similar downshift techniques may be used in disclosed embodiments based on various power events, temperature events, or some combination thereof.

Example Rate Limiter Techniques

Figure 2:
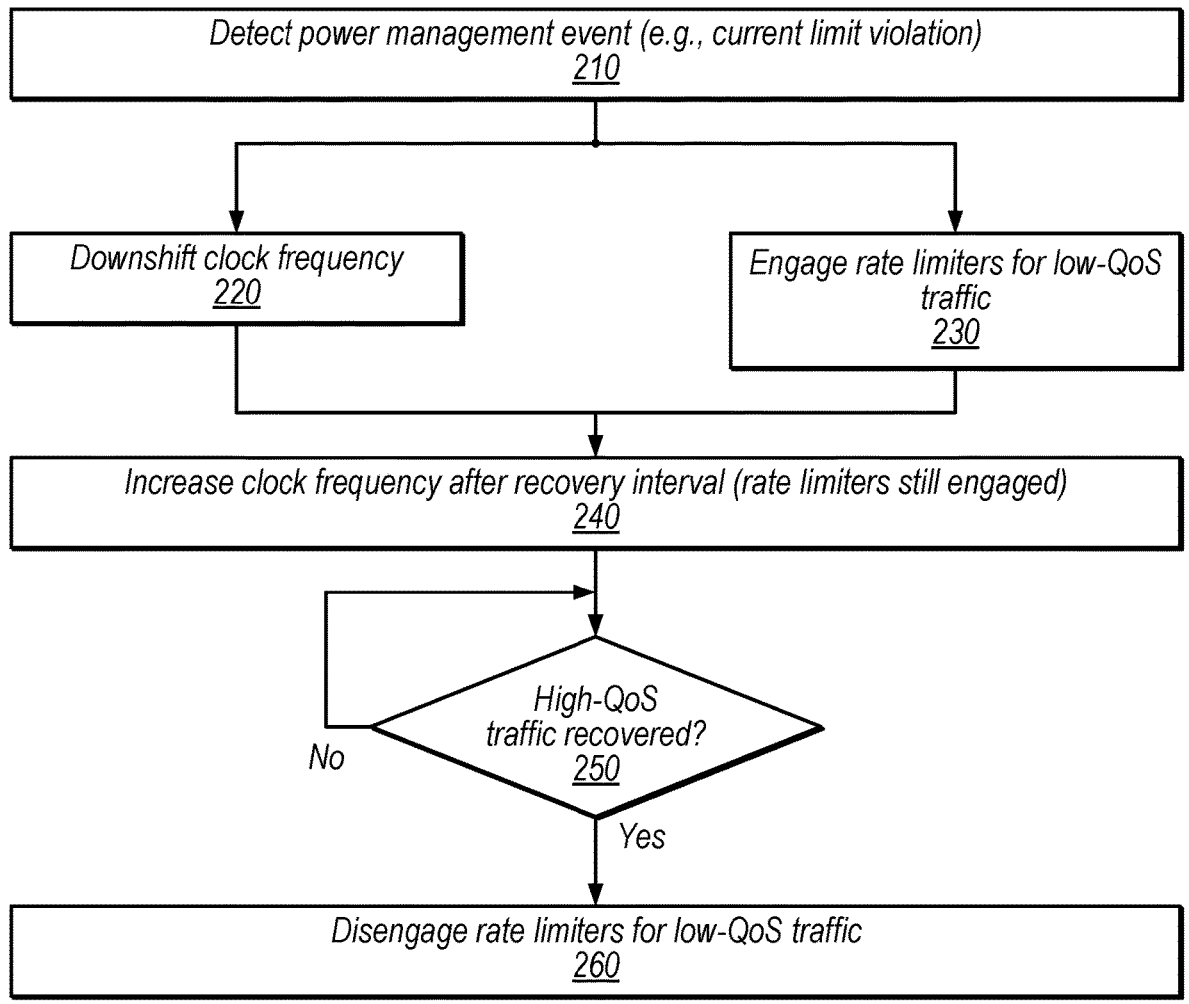
FIG. 2 is a flow diagram illustrating example parallel rate limit and downshift techniques, according to some embodiments.

FIG. 2 is a flow diagram illustrating an example rate limiter technique, according to some embodiments. The method shown in FIG. 2 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 210, in the illustrated example, control circuitry (e.g., power management circuitry 110) detects a power management event, such as a current limit violation. Various other power management events are contemplated such as a low voltage event, a change in a voltage or current that meets a threshold rate of change, a detected pattern in one or more measurements, etc. Generally, the power management event may indicate that undesirable results may occur in the future if corrective action is not taken, such as incorrect processing results, equipment damage, etc. Note that the detection could be internal to a system-on-a-chip or based on sensors received via an external pin, for example. Flow proceeds in parallel to 220 and 230.

At 220, the control circuitry downshifts a clock frequency. The downshifted clock(s) may be for fabric 140 and may also be shared by one or more other elements. This may reduce the bandwidth capabilities of fabric 140 during the downshift. Note that the device may also engage clock dithering in parallel with elements 220 and 230.

At 230, the control circuitry engages one or more rater limiters for low-QoS traffic on fabric 140. In some instances, this may completely block one or more lower-QoS virtual channels. In other instances, this may limit one or more lower-QoS virtual channels to a certain amount of data per time period, portion of overall traffic, etc. Note that while blocks 220 and 230 occur at least partially in parallel, they may not begin or end at exactly the same time. In particular, the rate limiting may continue after recovery of the clock frequency, as discussed in detail below.

Generally, the circuitry that controls the downshift of element 220 may be able to engage and reduce power consumption much faster than the rate limiter circuitry engaged in element 230. While rapid, however, the downshift is potentially harmful to fabric traffic because it is not QoS-aware. Therefore, the rate limiting may reduce harmful impacts of the downshift and allow the downshift to end sooner. This two-stage, overlapping approach may advantageously achieve power management goals while reducing or avoiding negative impacts to high-QoS fabric traffic.

At 240, the control circuitry increases the clock frequency after a recovery interval. At this point, the rater limiters are still engaged, which may allow fabric 140 to meet targets for higher-QoS traffic (e.g., real-time traffic) by keeping the lower-QoS traffic limited. Note that the clock frequency increase of element 240 may therefore be advantageously initiated sooner, relative to implementations that do not engage data rate limiters while the data rate limiter may ensure that power consumption remains reduced, while engaged, in some embodiments.

At 250, the control circuitry determines whether the high-QoS traffic has recovered. This may be based on buffer status for the higher-QoS traffic, for example, or other measurements of impact of the downshift on the higher-QoS traffic. Examples of inputs to a recovery determination include current latency tolerance for real-time traffic (which may be based on buffer status), whether a time interval has elapsed corresponding to a frame (or a certain number of frames) of data for isochronous traffic, etc. If the high-QoS traffic has recovered, flow proceeds to 260 and the control circuitry disengages rate limiters for low-QoS traffic (the disengagement may be gradual, as discussed in detail below). If not, flow reverts to 250 and rate limiting continues.

Note that while various examples herein include relatively higher and lower-QoS virtual channels, any number of virtual channels may be implemented in other embodiments. Example QoS parameters include latency, bandwidth, periodicity, etc. For example, some embodiments may include separate virtual channels for real-time, low latency, isochronous, and bulk traffic, all of which may have different QoS parameters. Rate limiting may be imposed for only a subset of supported virtual channels. Further, rate limiting may impose different limits on different virtual channels. In some embodiments, all channels may be rate limited, but with greater limitations imposed on virtual channels having relatively lower QoS.

In some embodiments, QoS-aware rate limiting supports both over-current protection and thermal protection triggers while preferentially protecting higher-QoS traffic. In some embodiments, disclosed techniques also provide indirect activity control for one or more clients that do not natively support activity limits, e.g., by reducing their bandwidth to resources such as memory via the fabric (and still protecting higher-QoS traffic). In some embodiments, the rate limiting is sufficient to guarantee that power management circuitry does not exceed its power delivery capabilities. Said another way, disclosed techniques may keep the power consumption envelope within the capabilities of a power supply while still providing quality of service needs for important traffic.

In some embodiments, telemetry circuitry is configured to provide information relating to operations during rate limiting. For example, the telemetry circuitry may aggregate and report information such as bandwidth use by one or more clients during rate limiting, buffer status during rate limiting, frequency at which rate limiting occurs, duration of a given rate limiting sequence or state, etc.

Figure 3:
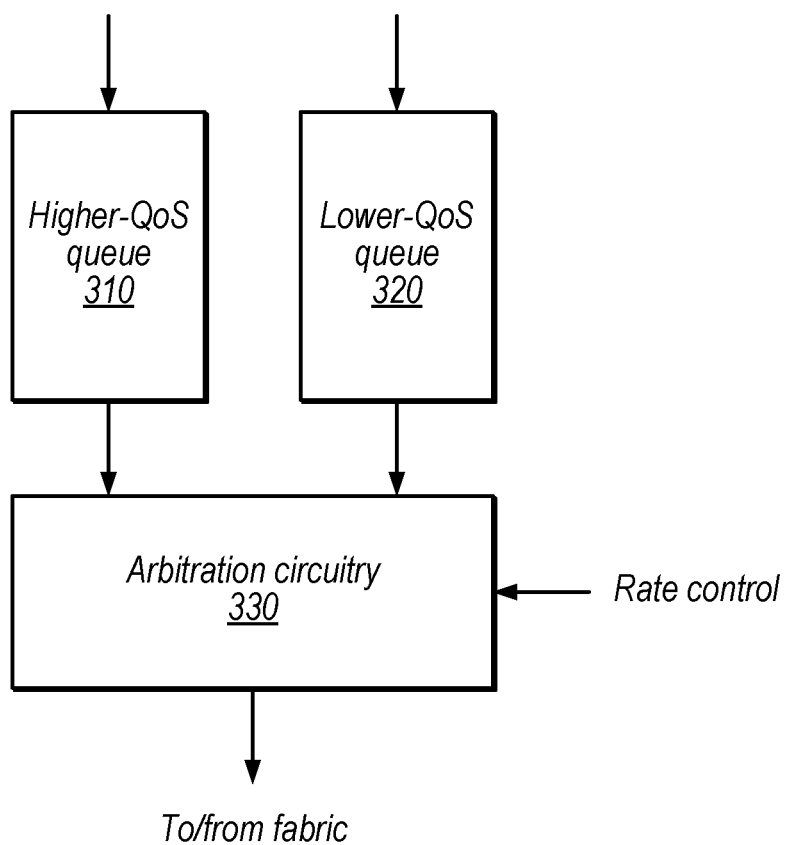
FIG. 3 is a block diagram illustrating an example selective rate limiter, according to some embodiments.

FIG. 3 is a block diagram illustrating example selective rate limiter circuitry, according to some embodiments. In the illustrated example, arbitration circuitry 330 receives inputs from a higher-QOS queue 310 and a lower QoS queue 320 and provides an output to or from fabric 140. This selection may be implemented using multiplexer circuitry, for example. As discussed above, arbitration circuitry 330 may arbitrate among any appropriate number of queues or buffers for different virtual channels, in various embodiments.

In the illustrated embodiment, arbitration circuitry 330 selects from among multiple inputs based on a rate control input, e.g., that provides a relatively lower ratio of clock cycles for selection from queue 320. Note that various arbitration inputs and algorithms may be implemented by circuitry 330 in other embodiments, e.g., to specify a complete block on certain types of traffic in certain scenarios, per-traffic-type limits, ratios among different traffic types, etc. Further, arbitration circuitry 330 may implement a gradual back-off, in some embodiments, that reduces the rate limiting on one or more lower-QoS virtual channels gradually as the higher-QoS traffic recovers.

In some embodiments, quality of service is enforced using credit mechanisms in which buffers are allowed to transmit data based on availability of credits and credits are returned on completion (credits may also be provided for other reasons, e.g., using a leaky bucket mechanism). Generally, rate limiting may be accomplished at various points in the fabric, clients, etc. For example, clients may be prohibited from sending data for certain virtual channels, data for certain virtual channels may be stalled in a rate limiter buffer or fabric buffer, etc. Various counters, credit mechanisms, blocking signals, selection signals, etc. may be implemented to control which virtual channels are allowed to use shared fabric resources at different rates.

In some embodiments, a given rate limiter may limit average bandwidth over a time window to no more than a bandwidth limit corresponding to a rate limit level indicated by the power management circuitry 110. Power management circuitry 110 may be configured to signal multiple different levels of rate limiting based on different events. In some embodiments, the rate limiting may still guarantee forward progress for one or more virtual channels that are rate limited. Note that the rate limiting imposed by the rate limiter circuitry may be cumulative with other mechanisms such as clock downshifts that occur during the same time interval, rate limiting internal to the fabric, etc.

Figure 4:
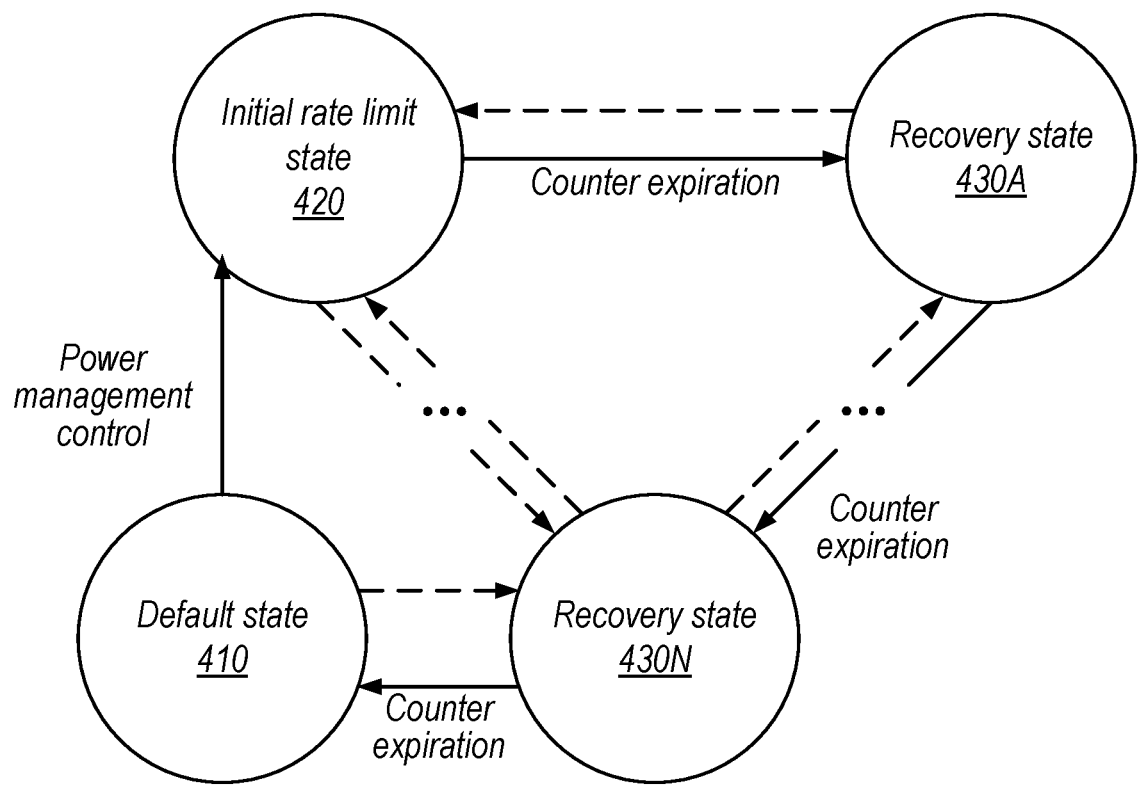
FIG. 4 is a diagram illustrating an example state machine for gradual rate limit backoff, according to some embodiments.

FIG. 4 is a state diagram illustrating example gradual rate limit release, according to some embodiments. The rate limiter may operate in the default state 410 until power management circuitry 110 sends a control signal indicating to begin rate limiting. In response, state transitions to initial rate limit state 420 (which may impose the most stringent rate limiting among the illustrated states). After a counter expiration, the state changes to recovery state 430A. Successive counter expirations change the state to one or more other recovery states until state 430N is reached, and eventually the default state 410. As shown by the dashed lines, power management circuitry 110 may send intermediate control signals that indicate to revert back to another rate limiting state asynchronously, e.g., based on sensor measurements. Note that the counter values for different recovery states may vary and may be programmable, e.g., to configure the gradual rate limit release. Further, transition to a recovery state may be conditioned on recovery inputs such as current latency tolerance, as discussed above.

In some embodiments, rate limiting may be implemented using a multi-bit pattern for each limit/recovery state. A rate limiter may iterate through indices of the multi-bit pattern and suppress grants, block grant counter updates, or both in cycles in which the current bit of the current multi-bit pattern is clear. To provide bandwidth guarantees, arbitration circuitry 330 may re-select weights and re-initialize credit grant counters whenever rate limiting is engaged (e.g., when transitioning from state 410 to any other state in the example of FIG. 4). Re-setting the grant counters may ensure that bandwidth distribution follows the selected weights.

Example Rate Limiters for Clients that Support Different Virtual Channels

Figure 5:
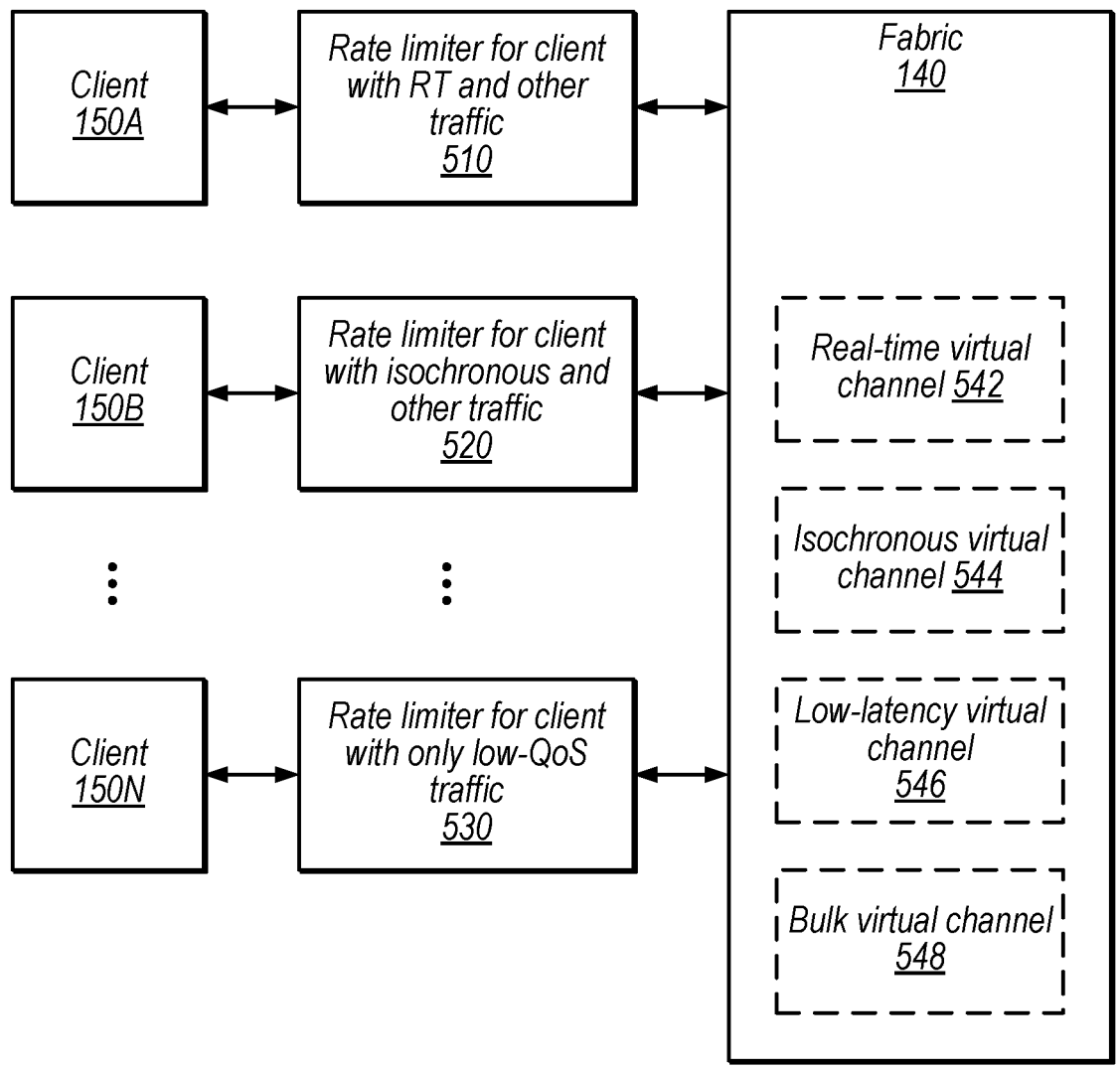
FIG. 5 is a block diagram illustrating example rate limiters for clients that support different sets of virtual channels, according to some embodiments.

FIG. 5 is a block diagram illustrating example rate limiters for different types of clients, according to some embodiments. In the illustrated example, fabric 140 supports separate virtual channels 542, 544, 546, and 548 for real-time traffic, isochronous traffic, low-latency traffic, and bulk traffic, respectively. These specific virtual channels are included for purposes of illustration but not intended to limit the scope of the present disclosures. Other embodiments may support subsets of these channels, additional channels, etc. Further, similar techniques may be used with non-virtual channels.

In the illustrated embodiment client 150A generates real-time traffic (and at least one other type of traffic) and communicates via at least two of the virtual channels. Similarly, client 150B generates isochronous traffic and at least one other type of traffic. Client 150N generates only low-QoS traffic (at least relative to real-time and isochronous traffic), e.g., such as low-latency traffic, bulk traffic or both.

The rate limiters 510, 520, and 530 for the different clients may be different in various aspects. For example, they may include different queues for the different virtual channels, may implement different ratios among their virtual channels, may back-off of rate limiting based on different considerations and therefore at different times or rates, etc. Further, rate limiter 530 may include only a single queue in some embodiments and may rate limit the queue by blocking it from sending data, at least in some cycles. In other embodiments, a unified rate limiter may impose rate limits for multiple clients, the rate limiters may communicate to coordinate their rate limiting, or both.

Example Method

Figure 6:
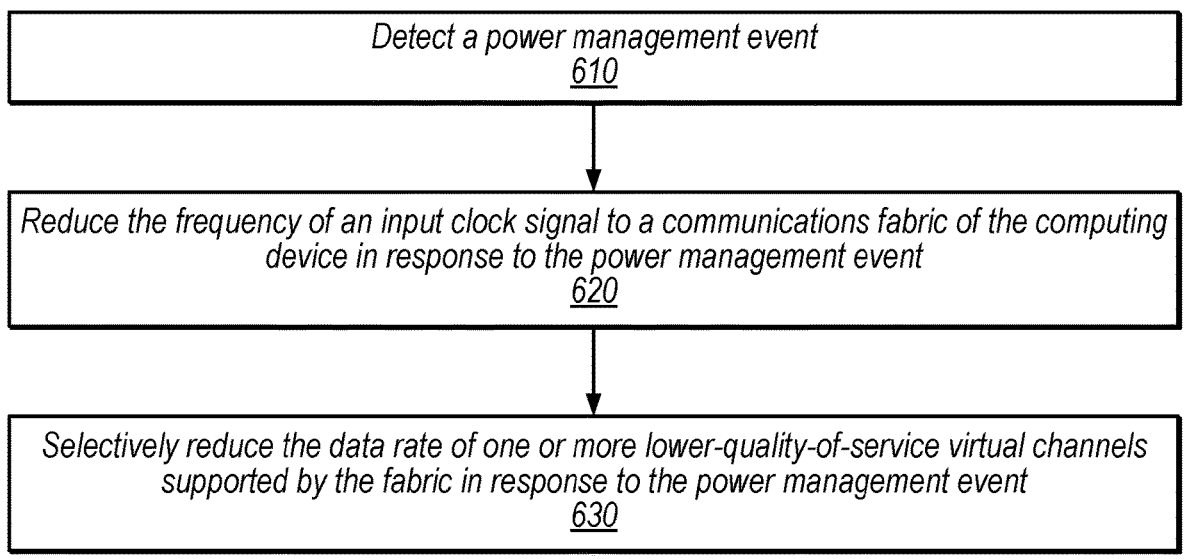
FIG. 6 is a flow diagram illustrating an example method, according to some embodiments.

FIG. 6 is a flow diagram illustrating an example method for selective rate limiting of fabric channels, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, a computing device (e.g., power management circuitry) detects a power management event.

At 620, in the illustrated embodiment, the computing device (e.g., clock control circuitry) reduces the frequency of an input clock signal to a communications fabric of the computing device in response to the power management event.

At 630, in the illustrated embodiment, the computing device (e.g., data rate limiter circuitry) selectively reduces data rate of one or more lower-quality-of-service virtual channels supported by the fabric in response to the power management event. In some embodiments, the power management event is a current limit violation and the data rate limiter circuitry is configured to selectively reduce the data rate as a function of the amount of the current limit violation. The data rate limiter circuitry may similarly reduce data rate as a function of values corresponding to other events (e.g., an amount of temperature limit violation, an amount of voltage limit violation, etc.).

In some embodiments, the data rate limiter circuitry is configured to continue selectively reducing data rate of the one or more lower-quality-of-service virtual channels after the clock control circuitry has caused recovery of the frequency of the input clock signal (e.g., recovery to the nominal frequency prior to the frequency reduction). In some embodiments, the selective reduction guarantees that traffic on the fabric circuitry does not cause circuitry powered by the power management circuitry to exceed capabilities of the power management circuitry.

In some embodiments, the data rate limiter circuitry includes multiple different types of data rate limiters configured to control data rate for client circuits that support different subsets of a set of virtual channels supported by the apparatus.

In some embodiments, the data rater limiter circuitry is configured to gradually recover the data rate of the selectively reduced one or more lower-quality-of-service virtual channels over time. In some embodiments, the data rate limiter circuitry is configured to increase the data rate of the one or more lower-quality-of-service virtual channels subsequent to the selective reduction, in response to detection of a threshold latency tolerance for one or more higher-quality-of-service virtual channels (e.g., a real-time channel) meeting a threshold. In some embodiments, the data rate limiter circuitry is configured to increase the data rate of the one or more lower-quality-of-service virtual channels subsequent to the selective reduction, in response to a time interval having elapsed, wherein the time interval corresponds to a frame of data for a higher-quality-of-service virtual channel (e.g., an isochronous channel). In some embodiments, one or more recovery states with gradually lessened rate limiting are entered based on a combination of time elapsed and other inputs such as latency tolerance, control signals from power management circuitry, etc.

In some embodiments, the device includes telemetry circuitry configured to generate telemetry information that indicates bandwidth used by one or more clients during the selective reduction and frequency of the selective reduction.

In some embodiments, the fabric circuitry includes multiple independent networks and the data rate limiter circuitry is configured to selectively reduce data rate of one or more lower-quality-of-service virtual channels or multiple networks of the multiple independent networks in response to the power management event.

As used herein, the terms "clock" and "clock signal" refer to a periodic signal, e.g., as in a two-valued (binary) electrical signal. A clock periodically changes between "levels" of the clock such as voltage ranges of an electrical signal. For example, voltages greater than 0.7 volts may be used to represent one clock level and voltages lower than 0.3 volts may be used to represent another level in a binary configuration. As used herein, the term "clock edge" refers to a change in a clock signal from one level to another level. As used herein, the term "toggle" in the context of a clock signal refers to changing the value of the clock signal from one level to another level in a binary clock configuration. As used herein, the term clock "pulse" refers to an interval of a clock signal between consecutive edges of the clock signal (e.g., an interval between a rising edge and a falling edge or an interval between a falling edge and a rising edge). Note that sequential circuitry may perform operations on a rising edge of a clock signal, a falling edge of a clock signal, or both (which may be referred to as dual-edge triggered).

Example Device

Figure 7:
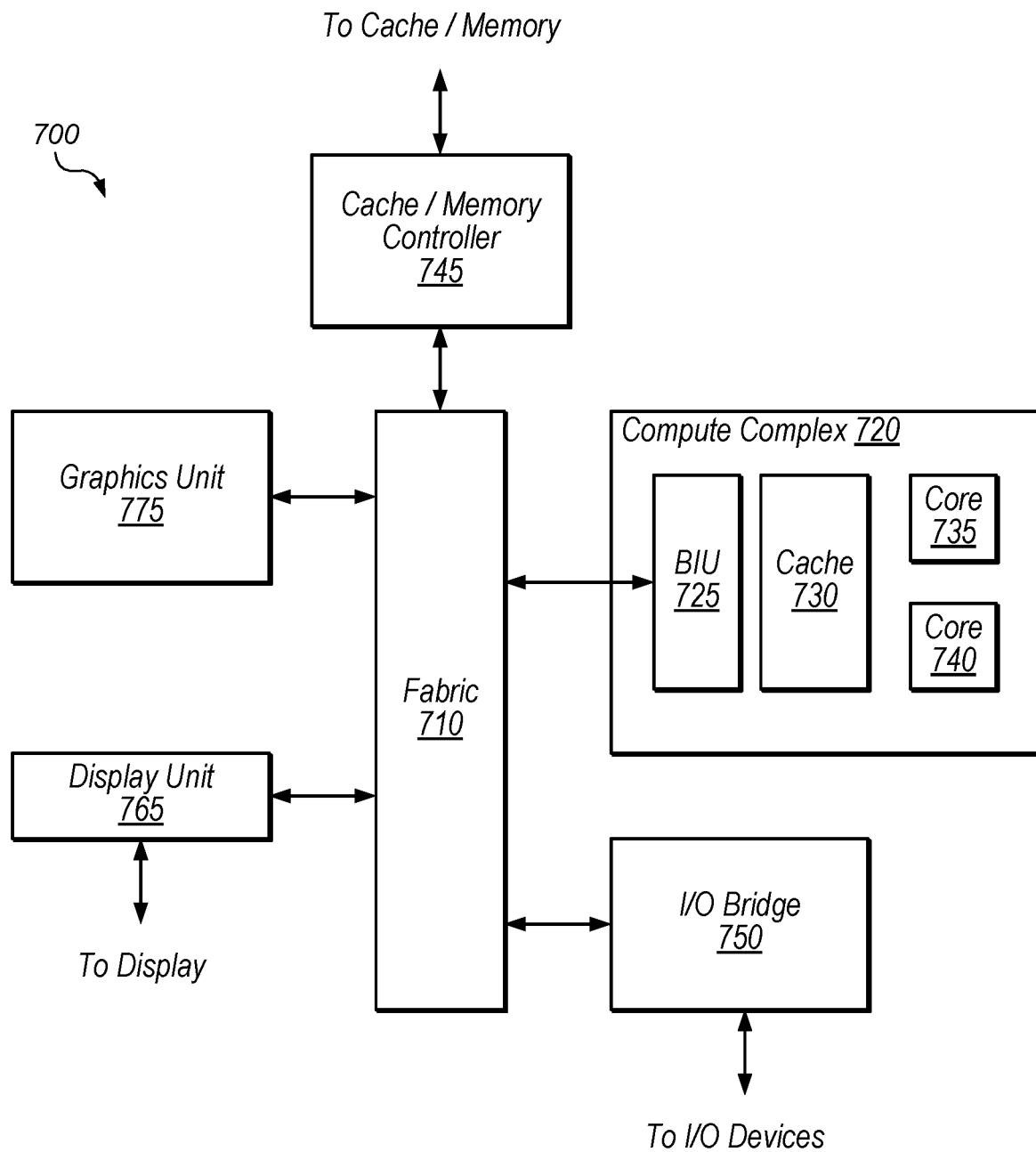
FIG. 7 is a block diagram illustrating an example computing device, according to some embodiments.

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In some embodiments, disclosed techniques may advantageously allow power management circuitry to reduce or avoid negative impacts of power events by reducing the clock frequency of fabric 710 while using rate limiting of other traffic to reduce impacts of the frequency reduction on high-priority traffic.

In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions. These instructions may be stored in computer readable medium such as a memory coupled to memory controller 745 discussed below.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Cache/memory controller 745 may be configured to manage transfer of data between fabric 710 and one or more caches and memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches. Memory coupled to controller 745 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 745 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 720 to cause the computing device to perform functionality described herein.

Graphics unit 775 may include one or more processors, e.g., one or more graphics processing units (GPU's). Graphics unit 775 may receive graphics-oriented instructions, such as OPENGL®, Metal, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 700 with connectivity to various types of other devices and networks.

Example Applications

Figure 8:
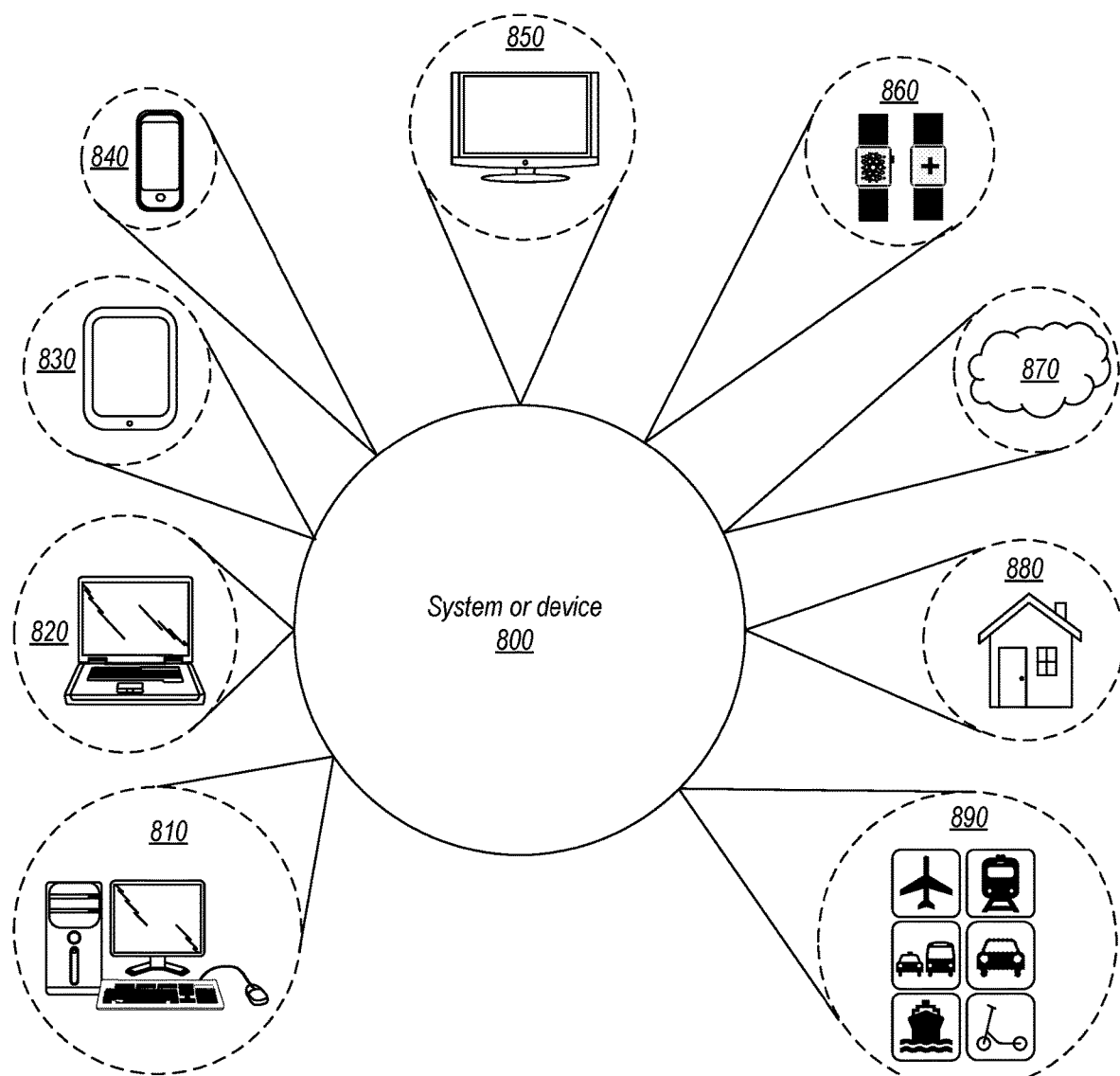
FIG. 8 is a diagram illustrating example applications of disclosed systems and devices, according to some embodiments.

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a computing system configured to generate a simulation model of the hardware circuit, by a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 9:
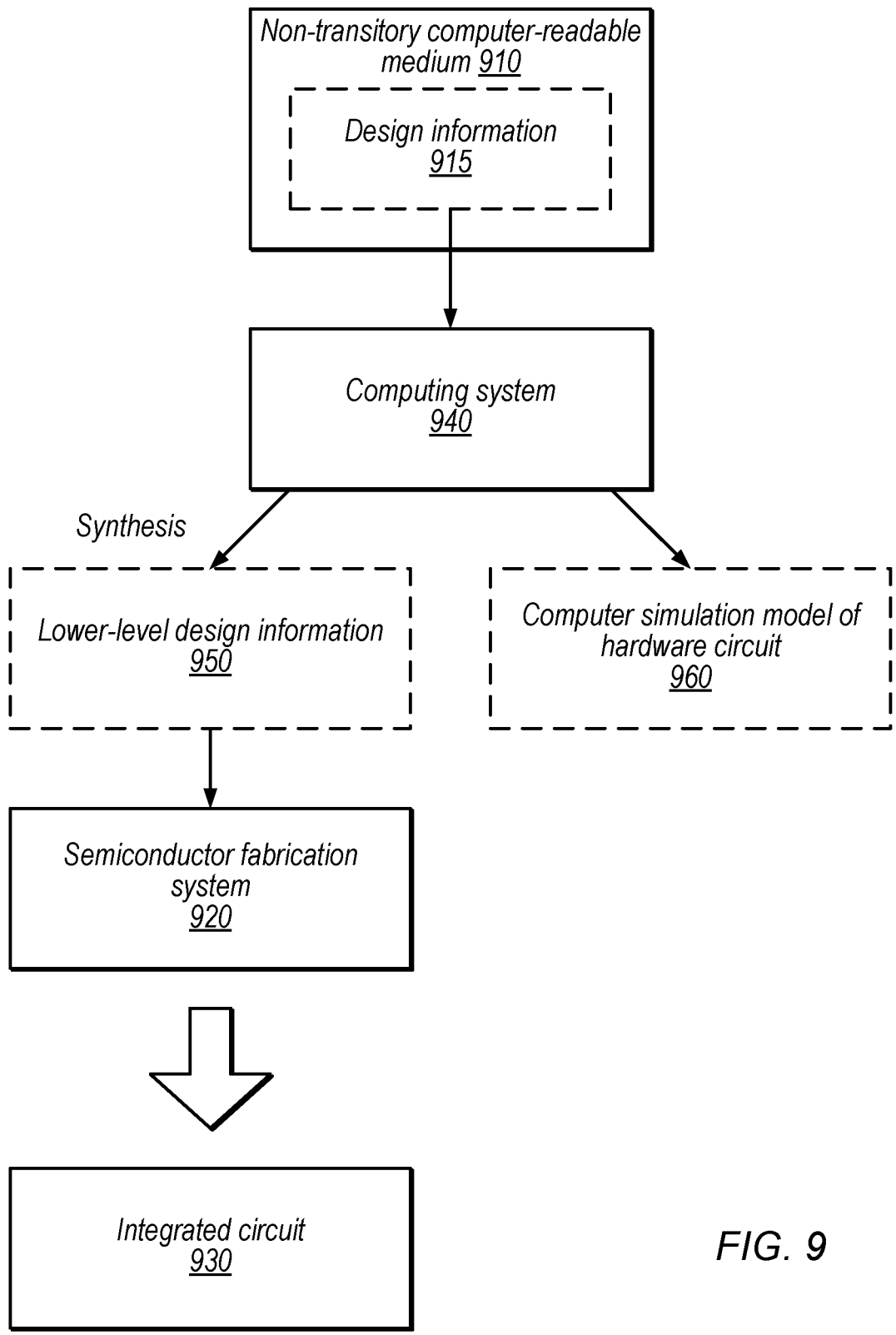
FIG. 9 is a block diagram illustrating an example computer-readable medium that stores circuit design information, according to some embodiments.

FIG. 9 is a block diagram illustrating an example non-transitory computer-readable storage medium that stores circuit design information, according to some embodiments. In the illustrated embodiment, computing system 940 is configured to process the design information. This may include executing instructions included in the design information, interpreting instructions included in the design information, compiling, transforming, or otherwise updating the design information, etc. Therefore, the design information controls computing system 940 (e.g., by programming computing system 940) to perform various operations discussed below, in some embodiments.

In the illustrated example, computing system 940 processes the design information to generate both a computer simulation model of a hardware circuit 960 and lower-level design information 950. In other embodiments, computing system 940 may generate only one of these outputs, may generate other outputs based on the design information, or both. Regarding the computing simulation, computing system 940 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 940 also processes the design information to generate lower-level design information 950 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 950 (potentially among other inputs), semiconductor fabrication system 920 is configured to fabricate an integrated circuit 930 (which may correspond to functionality of the simulation model 960). Note that computing system 940 may generate different simulation models based on design information at various levels of description, including information 950, 915, and so on. The data representing design information 950 and model 960 may be stored on medium 910 or on one or more other media.

In some embodiments, the lower-level design information 950 controls (e.g., programs) the semiconductor fabrication system 920 to fabricate the integrated circuit 930. Thus, when processed by the fabrication system, the design information may program the fabrication system to fabricate a circuit that includes various circuitry disclosed herein.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof.

Accordingly, non-transitory computer-readable storage medium 910 may include two or more memory media; such media may reside in different locations—for example, in different computer systems that are connected over a network.

Design information 915 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 940, semiconductor fabrication system 920, or both. In some embodiments, design information may also include one or more cell libraries that specify the synthesis, layout, or both of integrated circuit 930. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 930 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 and model 960 are configured to operate according to a circuit design specified by design information 915, which may include performing any of the functionality described herein. For example, integrated circuit 930 may include any of various elements shown in FIGS. 1, 3, 5, and 7. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 920 to fabricate integrated circuit 930.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
fabric circuitry configured to:
operate based on an input clock signal; and
provide multiple virtual channels that share one or more hardware fabric switches, wherein one or more of the virtual channels have different quality of service parameters;
multiple client circuits configured to communicate via the fabric circuitry;
power sensor circuitry configured to measure at least one of electrical current and electrical voltage to detect a power management event corresponding to an electrical current draw by the apparatus that meets an electrical current event criterion;
clock control circuitry configured to reduce a frequency of the input clock signal in response to the power management event; and
data rate limiter circuitry configured to selectively reduce the data rates of one or more lower-quality-of-service virtual channels in response to the power management event, including to continue selectively reducing data rate of the one or more lower-quality-of-service virtual channels after the clock control circuitry has caused recovery of the frequency of the input clock signal.

2. The apparatus of claim 1, wherein the reduction of the frequency of the input clock signal provides an initial mitigation for the power management event that does not utilize quality-of-service information as an input.

3. The apparatus of claim 1, wherein the data rate limiter circuitry is configured to gradually recover the data rate of the selectively reduced one or more lower-quality-of-service virtual channels over time.

4. The apparatus of claim 1, wherein the data rate limiter circuitry is configured to increase the data rate of the one or more lower-quality-of-service virtual channels subsequent to the selective reduction, in response to detection of a threshold latency tolerance for one or more higher-quality-of-service virtual channels meeting a threshold.

5. The apparatus of claim 1, wherein the data rate limiter circuitry is configured to increase the data rate of the one or more lower-quality-of-service virtual channels subsequent to the selective reduction, in response to a time interval having elapsed, wherein the time interval corresponds to a frame of data for a higher-quality-of-service virtual channel.

6. The apparatus of claim 1, further comprising:
power management circuitry configured to provide power to the fabric circuitry and one or more other circuits, wherein the selective reduction guarantees that traffic on the fabric circuitry does not cause circuitry powered by the power management circuitry to exceed capabilities of the power management circuitry.

7. The apparatus of claim 1, wherein the power management event is a current limit violation and the data rate limiter circuitry is configured to selectively reduce the data rate based on an amount of the current limit violation.

8. The apparatus of claim 1, wherein the data rate limiter circuitry includes multiple different types of data rate limiters configured to control data rate for client circuits that support different subsets of a set of virtual channels supported by the apparatus.

9. The apparatus of claim 1, wherein the apparatus includes telemetry circuitry configured to generate telemetry information that indicates:
bandwidth used by one or more clients during the selective reduction; and
frequency of the selective reduction.

10. The apparatus of claim 1, wherein the fabric circuitry includes multiple independent networks and the data rate limiter circuitry is configured to selectively reduce data rate of one or more lower-quality-of-service virtual channels or multiple networks of the multiple independent networks in response to the power management event.

11. A method, comprising:
operating, by a computing device, a communications fabric based on an input clock signal, including providing multiple virtual channels that share one or more hardware fabric switches, wherein one or more of the virtual channels have different quality of service parameters;
detecting, by power sensor circuitry of the computing device that measures at least one of electrical current and electrical voltage, a power management event corresponding to an electrical current draw that meets an electrical current event criterion;

reducing, by the computing device, a frequency of the input clock signal in response to the power management event; and selectively reducing, by the computing device, the data rate of one or more lower-quality-of-service virtual channels in response to the power management event, wherein the selectively reducing continues after recovery of the frequency of the input clock signal.

12. The method of claim 11, further comprising:
gradually recovering the data rate of the selectively reduced one or more lower-quality-of-service virtual channels over time.

13. The method of claim 11, further comprising:
increasing the data rate of the one or more lower-quality-of-service virtual channels subsequent to the selective reduction, in response to detection of a threshold latency tolerance for one or more higher-quality-of-service virtual channels meeting a threshold.

14. The method of claim 11, further comprising:
increasing the data rate of the one or more lower-quality-of-service virtual channels subsequent to the selective reduction, in response to a time interval having elapsed, wherein the time interval corresponds to a frame of data for a higher-quality-of-service virtual channel.

15. The method of claim 11, wherein the power management event is a current limit violation and an amount of the selective reduction is based on an amount of the current limit violation.

16. A non-transitory computer-readable medium having instructions of a hardware description programming language stored thereon that, when processed by a computing system, program the computing system to generate a computer simulation model, wherein the model represents a hardware circuit that includes:

fabric circuitry configured to:
operate based on an input clock signal; and
provide multiple virtual channels that share one or more hardware fabric switches, wherein one or more of the virtual channels have different quality of service parameters;

multiple client circuits configured to communicate via the fabric circuitry;

power sensor circuitry configured to measure at least one of electrical current and electrical voltage to detect a power management event corresponding to an electrical current draw by the hardware circuit that meets an electrical current event criterion;

clock control circuitry configured to reduce a frequency of the input clock signal in response to the power management event; and data rate limiter circuitry configured to selectively reduce the data rates of one or more lower-quality-of-service virtual channels in response to the power management event, including to continue selectively reducing data rate of the one or more lower-quality-of-service virtual channels after the clock control circuitry has caused recovery of the frequency of the input clock signal.

17. The non-transitory computer-readable medium of claim 16, wherein the data rate limiter circuitry is configured to gradually recover the data rate of the selectively reduced one or more lower-quality-of-service virtual channels over time.

* * * * *